(12) United States Patent
Baranda et al.

(10) Patent No.: US 8,444,515 B2
(45) Date of Patent: May 21, 2013

(54) ELEVATOR BELT ASSEMBLY WITH NOISE AND VIBRATION REDUCING GROOVELESS JACKET ARRANGEMENT

(75) Inventors: Pedro S. Baranda, Farmington, CT (US); Richard L. Hollowell, Hebron, CT (US); John T. Pitts, Avon, CT (US); Hugh J. O'Donnell, Longmeadow, MA (US)

(73) Assignee: Otis Elevator Company, Farmington, CT (US)

( * ) Notice: Subject to any disclaimer, the term of this patent is extended or adjusted under 35 U.S.C. 154(b) by 2697 days.

(21) Appl. No.: 10/010,937

(22) Filed: Nov. 13, 2001

(65) Prior Publication Data
US 2003/0092524 A1    May 15, 2003

(51) Int. Cl.
*F16G 1/28* (2006.01)
*F16G 5/20* (2006.01)
*B29D 29/00* (2006.01)

(52) U.S. Cl.
USPC .......... 474/266; 474/237; 474/260; 156/137; 187/251

(58) Field of Classification Search .......... 187/265, 187/254, 266, 269, 96, 251; 474/238, 153, 474/205, 260, 263, 262, 190, 237, 265, 266; 156/132, 156/139, 178, 179; 264/254, 140, 267, 257; 57/210, 57/212, 231; 174/113 K, 117 F, 112; 428/192, 428/167, 187; 198/502.1, 502.2, 847
See application file for complete search history.

(56) References Cited

U.S. PATENT DOCUMENTS

| | | | | |
|---|---|---|---|---|
| 2,194,833 A * | 3/1940 | Nassimbene | ................. | 474/250 |
| 2,740,459 A * | 4/1956 | Kilborn et al. | ................ | 156/178 |
| 3,348,585 A | 10/1967 | Post et al. | | |
| 3,608,605 A * | 9/1971 | Cole | ............................ | 152/533 |
| 3,848,037 A * | 11/1974 | Harper | ........................ | 264/46.4 |
| 4,227,041 A * | 10/1980 | Den et al. | .................. | 174/113 R |
| 4,257,833 A | 3/1981 | Jensen | | |
| 4,445,593 A * | 5/1984 | Coleman et al. | ............. | 187/413 |
| 5,425,830 A * | 6/1995 | Bhagwat et al. | ............. | 156/178 |
| 6,061,879 A | 5/2000 | Ericson et al. | .................. | 24/304 |
| 6,103,349 A * | 8/2000 | Matsumoto | ................... | 428/192 |
| 6,364,063 B1 * | 4/2002 | Aulanko et al. | ............. | 187/266 |
| 6,397,974 B1 * | 6/2002 | Adifon et al. | ................. | 310/261 |
| 6,508,051 B1 * | 1/2003 | De Angelis | .................... | 57/223 |
| 6,672,046 B1 | 1/2004 | Prewo et al. | | |
| 6,727,433 B2 * | 4/2004 | Tsai | ............................. | 174/112 |
| 2003/0024770 A1 * | 2/2003 | O'donnell et al. | ........... | 187/251 |

FOREIGN PATENT DOCUMENTS

| | | | |
|---|---|---|---|
| DE | 2057554 A1 * | 6/1971 | |
| DE | 29 06 619 A1 * | 7/1980 | |
| EP | 0 356798 A1 * | 3/1990 | |
| JP | 55-152037 | * 11/1980 | ............... 264/171.15 |

(Continued)

OTHER PUBLICATIONS

PCT International Search Report mailed Jul. 5, 2003.

*Primary Examiner* — Marcus Charles
(74) *Attorney, Agent, or Firm* — Carlson, Gaskey & Olds PC

(57) ABSTRACT

An elevator load bearing assembly includes a plurality of cords within a jacket. The cords are spaced from an exterior surface on the jacket such that the spacing remains generally constant along the length of the belt. The jacket has a smooth, uninterrupted exterior surface for contacting sheaves as the belt moves in the elevator system. A method of making the inventive belt assembly is disclosed. The inventive belt assembly minimizes the possibility for generating an annoying, audible sound and vibration during elevator operation.

35 Claims, 3 Drawing Sheets

FOREIGN PATENT DOCUMENTS

| | | | |
|---|---|---|---|
| JP | 60-193211 A | * | 10/1985 |
| JP | 63-21538 A | * | 9/1988 |
| JP | 08-247221 A | * | 9/1996 |
| WO | WO 99/43590 | | 9/1999 |
| WO | WO 99/43885 | | 9/1999 |
| WO | WO 00/37738 | | 6/2000 |
| WO | WO 00/58706 | | 10/2000 |
| WO | WO 01/14630 | | 3/2001 |

* cited by examiner

ELEVATOR BELT ASSEMBLY WITH NOISE AND VIBRATION REDUCING GROOVELESS JACKET ARRANGEMENT

BACKGROUND OF THE INVENTION

This invention generally relates to load bearing members for use in elevator systems. More particularly, this invention relates to an elevator belt assembly having a specialized jacket and cord arrangement.

Elevator systems typically include a cab and counterweight that move within a hoistway to transport passengers or cargo to different landings within a building, for example. A load bearing member, such as roping or a belt typically moves over a set of sheaves and supports the load of the cab and counterweight. There are a variety of types of load bearing members used in elevator systems.

One type of load bearing member is a coated steel belt. Typical arrangements include a plurality of steel cords extending along the length of the belt assembly. A jacket is applied over the cords and forms an exterior of the belt assembly. Some jacket application processes result in grooves being formed in the jacket surface on at least one side of the belt assembly. Some processes also tend to cause distortions or irregularities in the position of the steel cords relative to the exterior of the jacket along the length of the belt.

FIG. 1, for example, illustrates both of these phenomena. As can be seen, the spacing between the exterior of the jacket 20 and the cords 22 varies along the length of the belt. As can be appreciated from the illustration, the cords 22 are set within the jacket as if they comprise a series of cord segments (i.e., 24, 26) of equal length corresponding to the spacing between the grooves 30. The illustration of FIG. 1 includes an exaggeration of the typical physical cord layout for purposes of illustration. The actual distortions or changes in the position of the cords relative to the jacket outer surfaces may not be discernable by the human eye in some examples.

When conventional jacket application processes are used, the manner in which the cords are supported during the jacket application process tends to result in such distortion in the geometry or configuration of the cords relative to the jacket outer surfaces along the length of the belt.

While such arrangements have proven useful, there is need for improvement. One particular difficulty associated with such belt assemblies is that as the belt moves in the elevator system, the grooves and the cord placement in the jacket interact with other system components such as the sheaves and generate undesirable noise, vibration or both. For example, as the belt assembly moves at a constant velocity, a steady state frequency of groove contact with the sheaves creates an annoying, audible tone. The repeated pattern of changes in the cord spacing from the jacket outer surfaces is believed to contribute to such noise generation.

An alternative arrangement is required to minimize or eliminate the occurrence of vibrations or an annoying tone during elevator system operation. This invention addresses that need.

SUMMARY OF THE INVENTION

In general terms, this invention provides a belt assembly for use in an elevator system and includes a method of making the belt assembly. The belt assembly includes a plurality of cords extending generally parallel to a longitudinal axis of the belt. A jacket over the cords includes a generally smooth, continuous exterior surface that is adapted to contact sheaves in the elevator system as the belt moves.

A method according to this invention for making an elevator belt assembly includes aligning a plurality of cords in a selected arrangement. A urethane material is applied to the cords to encase the cords in the jacket such that the jacket has a smooth, continuous surface on an exterior of the jacket that is adapted to contact sheaves in an elevator system. A select tension is maintained on each of the cords while applying the jacket such that the cords are uniformally spaced from the smooth, continuous exterior on the jacket. The uniform spacing preferably extends along the entire length of the belt assembly.

A belt assembly designed according to this invention preferably includes having the cords positioned within the jacket such that a spacing between the cords and the exterior surface on the jacket remains generally uniform along the length of the belt. By controlling the geometry of the cords within the jacket, this invention enhances smoothness and quietness during elevator system operation.

The inventive arrangement eliminates the grooves present on many other designs and minimizes any variations in the placement of the cords relative to the jacket exterior. Having a more uniform cord placement and a smooth outer jacket surface reduces or eliminates the occurrence of an annoying audible tone or vibration during elevator operation.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
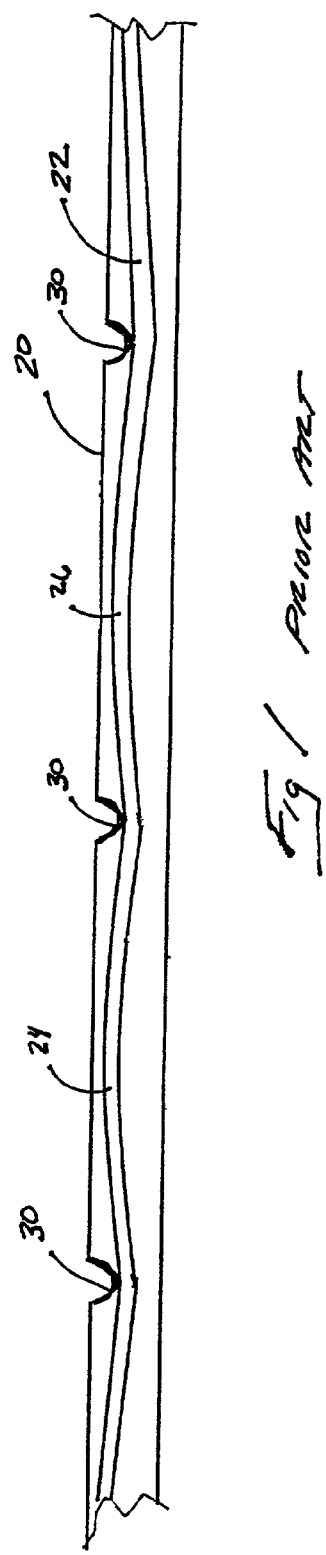
FIG. 1 schematically illustrates a typical cord geometry relative to outer surfaces on a belt jacket according to the prior art.
Figure 2:
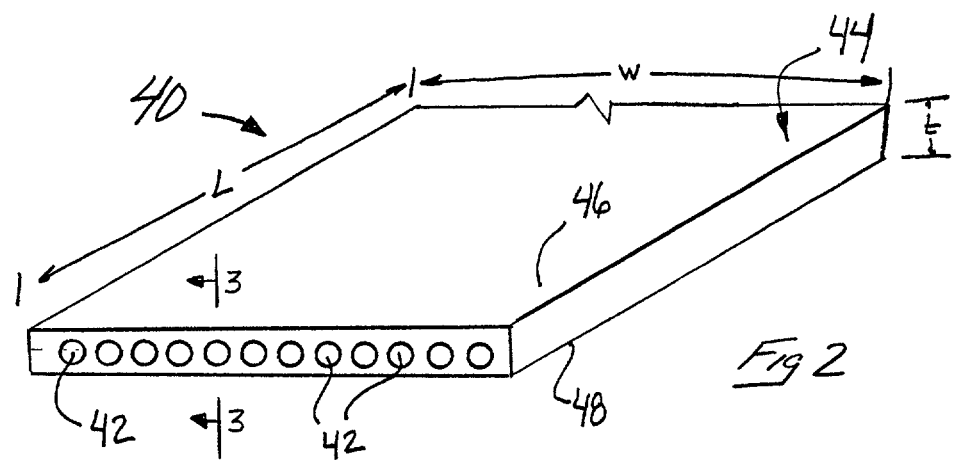
FIG. 2 schematically illustrates a portion of an example belt assembly designed according to an embodiment of this invention.
Figure 3:
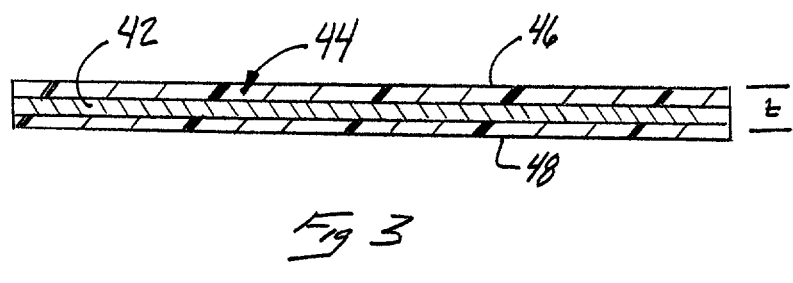
FIG. 3 is a cross-sectional illustration taken along the lines 3-3 in FIG. 2.

FIGS. 2 and 3 schematically illustrate a belt assembly 40 that is designed for use in an elevator system. A plurality of cords 42 are aligned generally parallel to a longitudinal axis of the belt assembly 40. In one example, the cords 42 are made of strands of steel wire.

A jacket 44 covers over the cords 42. The jacket 44 preferably comprises a polyurethane-based material. A variety of such materials are commercially available and known in the art to be useful for elevator belt assemblies. In one example, the preferred urethane material is an ether based polyurethane. In a particular example, an MDI ether based material is preferred for one particular embodiment of this invention.

The jacket material preferably has characteristics that render the belt assembly useful over long periods of time within an elevator system. The friction characteristics of the jacket material preferably are controlled precisely. In one example, a friction co-efficient value of 0.2 is the minimum preferred co-efficient. Having sufficient jacket friction characteristics ensures proper traction during operation of the elevator system.

The jacket material preferably has a high wear resistance and is resistant to cuts or tears so that abrasion of the belt assembly does not readily occur over the lifetime of the assembly. It is recognized that abrasion to the jacket contributes to induced vibrations and premature belt replacement and, therefore, a sufficient cut resistance or tear resistance is desired.

An additional desired characteristic of the jacket material is to have an adequate tensile strength to carry the load between the cords 42 and the sheaves within the elevator system. Because the jacket material contacts the sheaves, the load upon the cords must be accommodated between the cords and the sheaves by the jacket material.

Another characteristic of the jacket material that is preferred is a high hydrolysis resistance to avoid degradation of the jacket, which may otherwise occur because of the relatively high temperatures and relatively high humidity levels commonly experienced within an elevator hoistway. The material also preferably will not be adversely affected by other contaminants, such as lubricants, that may be encountered in some hoistways. It is also desirable to select a material so that ultraviolet radiation resistance is maximized.

Given this description, those skilled in the art will be able to select a proper jacket material to suit the needs of their particular situation.

The jacket 44 establishes an exterior length, L, width, W, and a thickness, t, of the belt assembly 40. In one example, the width W of the belt assembly is 30 millimeters and the thickness t is 3 millimeters. In the same example, the cords 42 have a diameter of 1.65 millimeters. The cords 42 preferably extend along the entire length L of the assembly.

The jacket 44 has exterior surfaces 46 and 48. At least one of the surfaces 46 or 48 will contact sheaves and possibly other components within the elevator system as the belt assembly 40 moves to provide the desired elevator cab movement. The exterior surfaces 46 and 48 preferably both are smooth and uninterrupted along the length L of the belt assembly 40. The inventive assembly departs from prior designs where a plurality of spaced grooves are present on at least one of the exterior surfaces 46 or 48. Eliminating the grooves provides a substantial advantage in reducing vibration, noise or both during elevator operation as the belt assembly 40 moves and contacts other components, such as sheaves, within the elevator system.

The surfaces 46 and 48 preferably are parallel to each other along the entire length of the belt assembly. Maintaining parallel surfaces is important for ensuring proper tracking of the elevator belt along the sheaves in the elevator system. Accordingly, this invention includes maintaining specific dimensional tolerances of the belt exterior configuration or geometry.

The cords 42 preferably are positioned within the jacket 44 so that the cords are completely encased by the jacket material. This provides better protection of the cords against corrosion and greater surface coverage and penetration of the cords with the jacket material. In prior designs, the portions of the cords at the groove locations were at least partially exposed and not fully covered with the material of the jacket 44.

The cords 42 preferably are positioned within the jacket 44 so that a spacing between the cords and at least one of the exterior surfaces 46 or 48 remains generally constant or continuous along the length L of the assembly 40. Maintaining a spacing between the cords and the exterior surface 46 or 48 of the jacket 44 that is as constant or continuous as possible eliminates a potential source of vibration, noise or both during elevator operation. Maintaining a generally constant spacing provides more smooth elevator operation. Some variation in the spacing between the cords 40 and the surfaces 46 and 48 may occur during the manufacturing process but that preferably is limited or controlled as much as possible. Some variation along the length of the belt may be acceptable but that should not be repeated at recurring, relatively short intervals.

Tension on the cords 42 preferably is maintained as described below during the belt making process to ensure that the cords 42 have a constant spacing from at least one of the exterior surfaces 46 or 48. In many cases, the surfaces 46 and 48 are exactly parallel and the spacing from both surfaces is kept constant.

Figure 4:
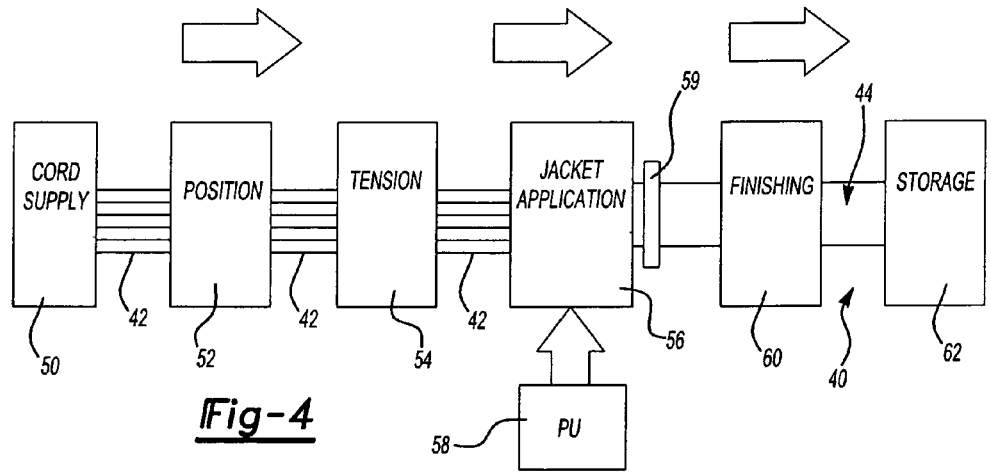
FIG. 4 is a schematic illustration of method of making a belt assembly designed according to an embodiment of this invention.

FIG. 4 schematically illustrates a method of making a belt assembly 40 designed according to this invention. A cord supply 50 provides the cords 42. In one example, the cord supply 50 comprises a plurality of spools containing the steel wire strands that are appropriately wound together to form the cords 42. The cords may be formed at the same facility as where the method of applying the jacket 44 is accomplished or the cords may be preformed and prespooled, depending on the needs of a particular situation.

It is common to have each cord pre-made and wound upon an individual spool. A single belt assembly may include twelve cords, for example. Accordingly, the manufacturing process accommodates twelve individual cords wound on twelve individual spools at a beginning section of the manufacturing equipment.

A positioning device 52 aligns the cords 42 in a desired alignment so that the cords will extend parallel to a longitudinal axis of the belt assembly 40. A tensioning device 54 controls an amount of tension on the cords 42 during the jacket application process. Although a single tension station 54 is schematically illustrated, multiple tension devices may be used along the assembly line of the belt assembly 40. For example, the same tension preferably is applied to the cords on both sides of the jacket application station 56. The tension station 54 preferably includes a suitably programmed controller that monitors and controls the tension within a desired range.

More particularly, the tension on each individual cord preferably is maintained at a desired level throughout the process of making the belt assembly so that the belt configuration or geometry is controlled as much as possible. The tension on each individual cord may be different with respect to the other cords. In one example, a base tension of approximately 50 Newtons is placed on each cord and a sample belt assembly is made. The sample belt assembly preferably then is inspected to make sure that the geometry is as desired. If there are undesirable variations, such as a slight curvature, the tension on one or more individual cords is adjusted to address the undesirable belt geometry variation. By making several samples and taking measurements and making adjustments, the necessary individual cord tensions to yield the desired belt geometry can be determined.

Figure 5:
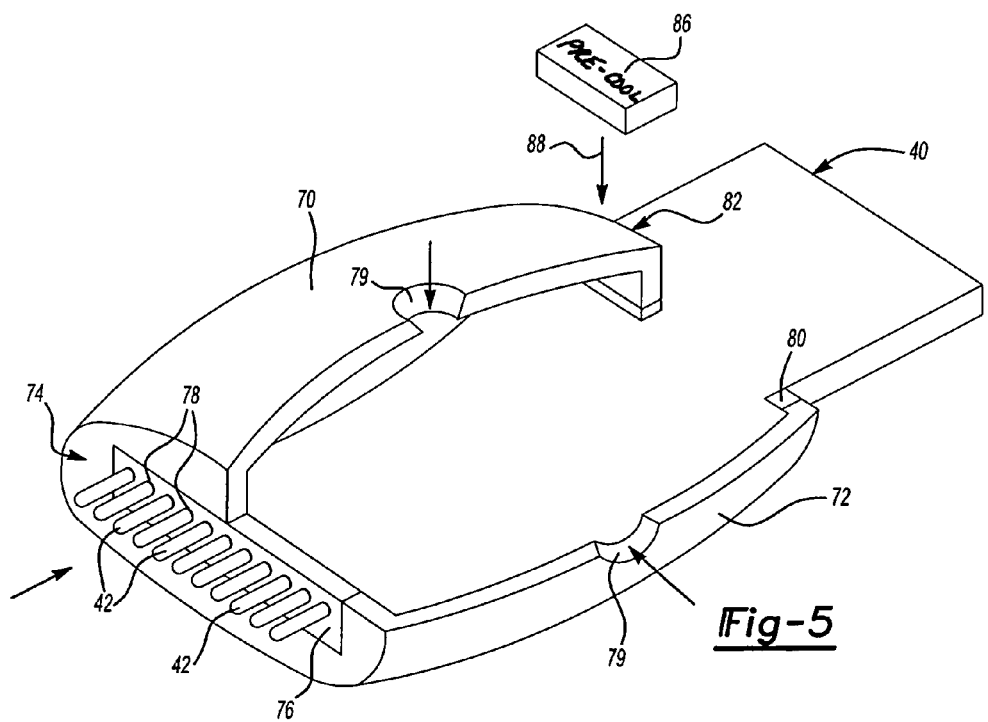
FIG. 5 schematically illustrates an example tool for performing a method of this invention.

The tension on each individual cord preferably is significant enough so that the cord horizontal position (as seen in FIGS. 2, 3 and 5, for example) remains the same throughout the jacket application process. Because this invention includes eliminating cord supports in the jacket application portion of the manufacturing process, the tensions used during the inventive process may need to be higher than those that were used in conventional techniques.

Although not specifically illustrated, tension feedback devices (as known in the art) preferably are incorporated into the manufacturing equipment so that the tension on each individual cord can be monitored and adjusted as needed throughout the entire assembly process.

The jacket application station 56 preferably includes a suitable mold or other device for applying the jacket material onto the cords 42. A supply 58 provides the chosen material to the jacket application station 56 in a conventional manner. The jacket material may be pressure molded, extruded or otherwise applied to the cords 42.

In one example, rollers 59 are included as part of or immediately after the jacket application station 56. The rollers 59 preferably are Teflon coated. The rollers 59 provide a surface treatment to the surfaces 46 and 48 of the belt assembly immediately after the application of the jacket material. The rollers 59 may provide an embossed pattern on the jacket surfaces, for example. The rollers 59 facilitate ensuring flat parallel surfaces 46 and 48. The rollers 59 preferably are included because the elimination of the cord supports as used in conventional equipment introduces a need for additional dimensional control. The rollers 59 provide such additional dimensional control.

In the illustrated example, the rollers 59 are positioned on opposite sides of the belt assembly (although only one roller is visible in the illustration of FIG. 4). The rollers 59 preferably extend across the entire width of the belt assembly for best dimensional control of the surfaces 46 and 48.

In one example, the rollers 59 are freewheeling and move responsive to movement of the belt assembly as it passes through the rollers. In another example, the rollers are motorized so that they move at a controlled rate.

The formed belt assembly 40 preferably is then processed at a finishing station 60. In one example, the finishing station 60 includes a forming device, a dimensional inspection device and a curing cold water bath where the jacket material and the cords within the material are cooled to a suitable temperature.

The finishing station forming device preferably includes a rigid structure that forces the jacket to have a desired exterior configuration. The inspection device, such as a known laser triangulation measuring device, determines whether the desired geometry was achieved.

The resulting belt assembly 40 preferably is then stored at 62, for example on spools for shipment to various locations for installation in elevator systems. The belt assembly 40 may be precut to specific lengths or may be provided in larger quantities where a technician at the installation selects the appropriate amount of belt material for a particular application.

FIG. 5 schematically illustrates an example molding device 70 for applying the jacket 44 to the cords 42. Conventional arrangements include a plurality of cord supports, which cause the formation of grooves in at least one exterior surface on the belt assembly 40. Because this invention includes eliminating such grooves, a typical cord supporting arrangement having such cord supports preferably is not used.

The example forming device 70 of FIG. 5 includes a mold housing 72 having an input side 74. A cord positioning device 76 preferably is situated at the input side 74. The cord positioning device 76 includes a plurality of openings 78 through which the cords 42 are fed into the device 70. The openings 78 preferably are accurately machined or otherwise formed so that a close tolerance is kept between the exterior of the cords 42 and the interior of the opening 78. Having a tight fitting between the openings 78 and the cords 42 prevents backflow of the jacket material during the molding process.

The mold housing 72 includes one or more openings 79 through which the jacket material is applied to the cords using pressure injection. As known in the art, pressure injection can be used for molding materials such as polyurethane when the material is suitably heated. Given this description, those skilled in the art will be able to select appropriate conditions for achieving a desired result.

The molding device 70 includes an opening 80 at an output side 82 of the mold housing 72. The opening 80 preferably is shaped to control the exterior shape and surfaces on the belt assembly 40.

Figure 6:
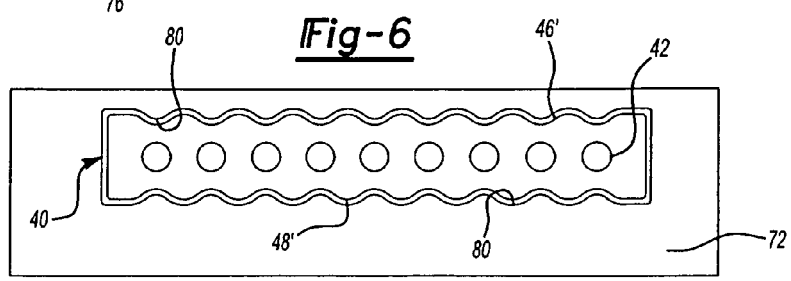
FIG. 6 schematically illustrates a preferred feature of the example tool also shown in FIG. 5.

The opening 80 of the molding device 70 in the example of FIG. 6 has a non-linear configuration along the portions of the opening that form the surfaces 46' and 48'. The non-linear configuration provides for differences in the thickness of the belt assembly as seen across the width. As can be appreciated from the illustration, the portions of the belt assembly corresponding to the locations of the cords 42 have a reduced thickness compared to the portions of the belt assembly where no cords are present.

The varying, non-linear configuration of the surfaces 46' and 48' are designed to accommodate the variation in the amount of shrinkage across the width of the belt that will occur during the finishing and curing of the belt assembly. It is believed that the amount of shrinkage corresponds to the cross section of urethane jacket material. In the areas where the cords 42 are present, there will be less shrinkage because of the presence of the cord material, which in some examples is steel. The portions of the belt assembly where cords are not present has a temporary greater thickness because there will be more shrinkage at those points of the assembly.

Providing a variation in the thickness across the width of the assembly facilities achieving a final resulting flat, parallel alignment between the surfaces 46 and 48. The type of configuration illustrated in FIG. 6 is unique to the inventive approach to manufacturing a belt assembly. In prior processes, mold wheels were included as part of the jacket application station. Such mold wheels operated to compress the jacket material into more of a flat configuration as part of the initial cooling process. Therefore, the non-linear, varying thickness approach, which is part of one example implementation of this invention, addresses the varying amounts of shrinkage that occur during a curing process in a unique manner.

In one example, there is approximately a 0.05 to 0.10 millimeter variation in the thickness of the jacket provided by the opening 80 of the molding device illustrated in FIG. 6. The overall dimensions of a particular belt assembly, the dimensions of the cords and the chosen jacket material will dictate the particular thickness variation required for a particular situation. Given this description, those skilled in the art will be able to select appropriate dimensions to meet the needs of their particular situation.

In one example, the selected jacket material is a waxless polyurethane. The polyurethane material used for the jacket in such an example does not include the wax additives normally added by polyurethane manufacturers. The owner of this application has a co-pending patent application on such an elevator belt assembly, which has Ser. No. 09/921,803 filed on Aug. 3, 2001, which has been published as U.S. Published Application No. US 2003/0024770. The teachings of that specification are incorporated into this description by reference.

When using a waxless polyurethane material, certain challenges are presented during the belt manufacturing process.

Because the polyurethane material does not contain the normal wax additives, it is more challenging to ensure proper mold release. One example arrangement for addressing this situation designed according to this invention is schematically shown in FIG. 5. A pre-cooling device 86 preferably is positioned near the opening 80 so that a cooling fluid, such as water or air schematically illustrated at 88, is applied to the mold or the just-formed jacket, or both, as the belt assembly exits the opening 80. The cooling fluid assists in at least slightly curing and shrinking the jacket material as it exits the molding device 70 so that it is more readily removed from the opening 80.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making an elevator belt assembly having a plurality of cords within a jacket, comprising the steps of:
   (a) aligning the plurality of cords in a selected arrangement;
   (b) applying a selected jacket material to the cords to encase the cords in the jacket with a generally smooth, uninterrupted surface on an exterior of the jacket that is adapted to contact sheaves in an elevator system; and
   (c) maintaining a selected tension on each of the cords on an individual cord basis while applying the jacket such that the tension on the cords controls positions of the cords within the jacket and the cords are uniformly spaced from the generally smooth, uninterrupted surface on the jacket along the length of the belt assembly.

2. The method of claim 1, including maintaining different tensions on different ones of the cords.

3. The method of claim 1, including performing steps (a) through (c) to make a sample belt assembly;
   inspecting the sample belt assembly;
   determining whether a configuration of the sample belt assembly is consistent with a desired configuration; and
   adjusting the tension maintained on at least one of the cords when the determined configuration is not consistent with the desired configuration.

4. The method of claim 3, including repeating the steps of claim 3 until the sample belt configuration is consistent with the desired configuration.

5. The method of claim 1, wherein the jacket material comprises a waxless urethane.

6. The method of claim 5, wherein step (B) includes using a molding device and including cooling at least one of the jacket material or the molding device as the applied jacket and the cords exit the molding device.

7. The method of claim 6, including applying a fluid to the jacket material or the molding device.

8. The assembly of claim 5, wherein the process includes applying the jacket material to the cords in a continuous and uninterrupted manner from near a first end of the cords to near a second, opposite end of the cords.

9. The method of claim 1, including using a molding device and wherein the molding device has an opening through which the belt assembly proceeds, the opening comprising a non-linear configuration such that a thickness of the jacket exiting the opening varies across the width of the jacket.

10. The method of claim 1, including finishing the exterior of the jacket by forcing the jacket into a shaping device that ensures that the jacket exterior has a desired configuration and cooling the belt assembly.

11. An elevator belt assembly made by the process, comprising the steps of:
   (a) aligning a plurality of cords in a selected arrangement;
   (b) applying a waxless urethane jacket material to the cords using a molding device and cooling at least one of the jacket material or the molding device as the applied jacket and the cords exit the molding device to encase the cords in the jacket with a smooth, uninterrupted surface on an exterior of the jacket that is adapted to contact sheaves in an elevator system; and
   (c) maintaining a selected tension on the cords, respectively, while applying the jacket such that the tension on the cords controls positions of the cords within the jacket and the cords are uniformly spaced from the smooth, uninterrupted surface on the jacket along the length of the belt assembly.

12. The method of claim 1, including moving the cords in a direction parallel to a length of the cords while applying the jacket material to the cords.

13. The method of claim 1, including adjusting the tension on at least one of the cords while applying the jacket material to the cords.

14. The method of claim 1, including maintaining the selected tension on each of the cords such that the selected tension is the same on opposite sides of a jacket application station used for applying the jacket material to the cords for each individual cord.

15. The method of claim 1, including applying the jacket material to the cords in a continuous and uninterrupted manner from near a first end of the cords to near a second, opposite end of the cords.

16. The method of claim 1, comprising
   providing a plurality of cords that are all of the same construction.

17. An elevator belt assembly made by the process, comprising the steps of:
   (a) aligning a plurality of cords in a selected arrangement;
   (b) applying a selected jacket material to the cords to encase the cords in the jacket with a smooth, uninterrupted surface on an exterior of the jacket that is adapted to contact sheaves in an elevator system; and
   (c) maintaining a selected tension on each of the cords on an individual cord basis while applying the jacket such that the tension on the cords controls positions of the cords within the jacket and the cords are uniformly spaced from the smooth, uninterrupted surface on the jacket along the length of the belt assembly.

18. The assembly of claim 17, wherein the process includes maintaining different tensions on different ones of the cords.

19. The assembly of claim 17, wherein the jacket material comprises a waxless urethane and wherein step (b) of the process includes using a molding device and including cooling at least one of the jacket material or the molding device as the applied jacket and the cords exit the molding device.

20. The assembly of claim 19, wherein the process includes applying a fluid to the jacket material or the molding device.

21. The assembly of claim 17, wherein the jacket material comprises polyurethane and the cords comprise steel.

22. The assembly of claim 17, wherein the process includes finishing the exterior of the jacket by forcing the jacket into a shaping device that ensures that the jacket exterior has a desired configuration and cooling the belt assembly.

23. A method of making an elevator belt assembly having a plurality of cords within a jacket, comprising the steps of:
   (a) aligning the plurality of cords in a selected arrangement;

(b) applying a waxless urethane jacket material to the cords to encase the cords in the jacket with a generally smooth, uninterrupted surface on an exterior of the jacket that is adapted to contact sheaves in an elevator system; and (c) maintaining a selected tension on the cords, respectively, while applying the jacket such that the tension on the cords controls positions of the cords within the jacket and the cords are uniformly spaced from the generally smooth, uninterrupted surface on the jacket along the length of the belt assembly.

24. The method of claim 23, wherein step (b) includes using a molding device and including cooling at least one of the jacket material or the molding device as the applied jacket and the cords exit the molding device.

25. The method of claim 24, including applying a fluid to the jacket material or the molding device.

26. The assembly of claim 17, wherein the processing includes moving the cords in a direction parallel to a length of the cords while applying the jacket material to the cords.

27. The assembly of claim 17, wherein the processing includes adjusting the tension on at least one of the cords while applying the jacket material to the cords.

28. The assembly of claim 17, wherein the processing includes maintaining the selected tension on each of the cords such that the selected tension is the same on opposite sides of a jacket application station used for applying the jacket material to the cords for each individual cord.

29. The elevator belt assembly of claim 17, wherein the entire plurality of cords are all of the same construction.

30. A method of making an elevator belt assembly having a plurality of cords within a jacket, comprising the steps of:

(a) aligning the plurality of cords in a selected arrangement;

(b) applying a selected urethane jacket material to the cords to encase the cords in the jacket with a generally smooth, uninterrupted surface on an exterior of the jacket that is adapted to contact sheaves in an elevator system;

(c) maintaining a selected tension on the cords, respectively, while applying the jacket such that the tension on the cords controls positions of the cords within the jacket and the cords are uniformly spaced from the generally smooth, uninterrupted surface on the jacket along the length of the belt assembly; and (d) using a molding device that has an opening through which the belt assembly proceeds, the opening comprising a non-linear configuration such that a thickness of the jacket exiting the opening varies across the width of the jacket.

31. The method of claim 30, including moving the cords in a direction parallel to a length of the cords while applying the jacket material to the cords.

32. The method of claim 30, including adjusting the tension on at least one of the cords while applying the jacket material to the cords.

33. The method of claim 30, including maintaining the selected tension on each of the cords such that the selected tension is the same on opposite sides of a jacket application station used for applying the jacket material to the cords for each individual cord.

34. The method of claim 30, including applying the jacket material to the cords in a continuous and uninterrupted manner from near a first end of the cords to near a second, opposite end of the cords.

35. The assembly of claim 11, wherein the process includes applying a fluid to the jacket material or the molding device.

* * * * *